United States Patent
Nagano

(10) Patent No.: US 10,202,916 B2
(45) Date of Patent: Feb. 12, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shota Nagano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 15/032,786

(22) PCT Filed: Nov. 11, 2014

(86) PCT No.: PCT/IB2014/002535
§ 371 (c)(1),
(2) Date: Apr. 28, 2016

(87) PCT Pub. No.: WO2015/071753
PCT Pub. Date: May 21, 2015

(65) Prior Publication Data
US 2016/0265459 A1   Sep. 15, 2016

(30) Foreign Application Priority Data

Nov. 13, 2013 (JP) ................. 2013-234666

(51) Int. Cl.
*F02D 41/00* (2006.01)
*F02D 41/30* (2006.01)
(Continued)

(52) U.S. Cl.
CPC ....... *F02D 41/0085* (2013.01); *F02D 35/023* (2013.01); *F02D 41/0002* (2013.01);
(Continued)

(58) Field of Classification Search
CPC .... F02D 35/023; F02D 35/024; F02D 35/025; F02D 35/026; F02D 41/0002;
(Continued)

(56) References Cited

U.S. PATENT DOCUMENTS 7,870,844 B2 * 1/2011 Moriya .................. F02D 35/023
123/406.44
7,870,845 B2 * 1/2011 Sasaki ................... F02D 35/024
123/299
(Continued)

FOREIGN PATENT DOCUMENTS

JP          11148410 A  *  6/1999  .......... F02D 41/403
JP        2007-002780 A      1/2007
(Continued)

*Primary Examiner* — John Zaleskas
(74) *Attorney, Agent, or Firm* — Oliff PLC

(57) ABSTRACT

In a diesel engine, displacement of an amount of fuel injection is calculated on the basis of a reference amount of heat production and an actual amount of heat production, and an amount of fuel injection from an injector is corrected on the basis of the displacement of an amount of fuel injection. Displacement of a heat production rate gradient is calculated by subtracting an actual heat production rate gradient from a reference heat production rate gradient, displacement of an amount of intake air on the basis of the displacement of heat production rate gradient and the displacement of the amount of fuel injection, and the amount of intake air is corrected by adjusting a supercharging pressure of a turbocharger on the basis of the displacement of the amount of intake air. Accordingly, it is possible to adjust the amount of fuel injection and the amount of intake air.

7 Claims, 8 Drawing Sheets

(51) Int. Cl.
*F02D 41/38* (2006.01)
*F02D 35/02* (2006.01)
*F02D 41/40* (2006.01)

(52) U.S. Cl.
CPC ..... *F02D 41/0007* (2013.01); *F02D 41/3005* (2013.01); *F02D 41/3836* (2013.01); *F02D 41/40* (2013.01); *F02D 41/403* (2013.01); *F02D 2041/0022* (2013.01); *F02D 2041/389* (2013.01); *F02D 2200/021* (2013.01); *F02D 2200/0602* (2013.01); *F02D 2200/0614* (2013.01); *Y02T 10/144* (2013.01); *Y02T 10/44* (2013.01)

(58) Field of Classification Search
CPC ............... F02D 41/0007; F02D 41/403; F02D 41/3827; F02D 2041/001; F02D 2041/0022; F02D 2041/389; F02D 2200/0606; F02D 2200/0614
USPC .......................... 123/299, 435; 701/102–105
See application file for complete search history.

(56) References Cited

U.S. PATENT DOCUMENTS

| | | | | |
|---|---|---|---|---|
| 7,894,975 | B2* | 2/2011 | Morimoto | F02D 35/023 123/435 |
| 8,181,626 | B2* | 5/2012 | Nada | F02D 41/402 123/299 |
| 8,596,242 | B2* | 12/2013 | Nada | F02D 41/403 123/299 |
| 8,904,995 | B2* | 12/2014 | Nada | F02D 41/3035 123/299 |
| 2005/0247285 | A1* | 11/2005 | Nagai | F02D 35/023 123/305 |
| 2007/0079811 | A1* | 4/2007 | Nakane | F02D 41/403 123/478 |
| 2008/0022976 | A1* | 1/2008 | Morimoto | F02D 35/028 123/478 |
| 2008/0167786 | A1* | 7/2008 | Sasaki | F02D 35/023 701/102 |
| 2008/0172169 | A1* | 7/2008 | Kuronita | F02D 41/1448 701/103 |
| 2008/0243358 | A1* | 10/2008 | Kojima | F02D 35/025 701/102 |
| 2009/0064967 | A1 | 3/2009 | Shikawa et al. | |
| 2009/0292447 | A1* | 11/2009 | Yamaguchi | F02D 35/023 701/103 |
| 2010/0312454 | A1* | 12/2010 | Nada | F02D 41/403 701/103 |
| 2011/0077846 | A1* | 3/2011 | Zavala Jurado | F02D 35/023 701/111 |
| 2012/0143479 | A1* | 6/2012 | Nada | F02D 41/3029 701/104 |
| 2012/0253640 | A1* | 10/2012 | Nada | F02D 41/403 701/103 |
| 2013/0345950 | A1* | 12/2013 | Goto | F02D 35/026 701/104 |
| 2015/0369165 | A1* | 12/2015 | Nagano | F02D 41/40 701/104 |

FOREIGN PATENT DOCUMENTS

| | | | |
|---|---|---|---|
| JP | 2008-215338 A | 9/2008 | |
| JP | 2011-085061 A | 4/2011 | |
| JP | 2012-092748 A | 5/2012 | |
| JP | WO 2012127569 A1 * | 9/2012 | .......... F02D 35/026 |
| JP | 2014025380 A * | 2/2014 | |

* cited by examiner

CONTROL DEVICE FOR INTERNAL COMBUSTION ENGINE

BACKGROUND OF THE INVENTION

1. Field of the Invention

The present invention relates to a control device for an internal combustion engine. Particularly, the invention relates to a countermeasure for adjustment of an amount of fuel injection and an amount of intake air.

2. Description of Related Art

In the related art, as control of an engine mounted on a vehicle or the like, an amount of fuel injection from an injector is controlled so that an actual air-fuel ratio in a cylinder reaches a target air-fuel ratio (for example, Japanese Patent Application Publication No. 2011-85061 (JP 2011-85061 A) and Japanese Patent Application Publication No. 2007-2780 (JP 2007-2780 A)).

Specifically, in JP 2011-85061 A, a pressure variation in a cylinder is detected by an in-cylinder pressure sensor and a change in an air-fuel ratio is calculated from displacement of a pressure peak position (displacement from the pressure peak position in a steady operation state). The amount of fuel injection is corrected on the basis of the change in the air-fuel ratio, whereby the actual air-fuel ratio matches the target air-fuel ratio.

In JP 2007-2780 A, the amount of fuel injection from the injector is detected on the basis of an amount of intake air detected by an air flow meter so that the actual air-fuel ratio is maintained at the target air-fuel ratio or the actual air-fuel ratio gets close to the target air-fuel ratio.

SUMMARY OF THE INVENTION

However, since the control of the amount of fuel injection in the related art is performed on the basis of a technical idea that the actual air-fuel ratio gets close to the target air-fuel ratio, there are the following problems.

For example, in a situation in which an actual amount of intake air is larger than that is appropriate (for example, an amount of intake air suitable for an engine load or the like), such as a transitional operation state of an engine, even when the actual air-fuel ratio matches the target fuel ratio by controlling the amount of fuel injection, there is a possibility that the amount of fuel injection will be larger than that is appropriate. In this case, the amount of fuel injection is excessive, thereby causing degradation in fuel efficiency.

On the other hand, in a situation in which the actual amount of intake air is smaller than that is appropriate, even when the actual air-fuel ratio matches the target air-fuel ratio by controlling the amount of fuel injection, there is a possibility that the amount of fuel injection will be smaller than that is appropriate. In this case, the engine torque required by a driver cannot be achieved, thereby causing degradation in drivability.

The invention provides a control device for an internal combustion engine that can achieve adjustment of an amount of fuel injection and an amount of intake air.

—Solution Principle of the Invention—

The solution principle of the invention is that the amount of fuel injection is corrected on the basis of a difference between a reference value and an actual value of a parameter correlated with an amount of fuel in a cylinder and an amount of intake air is corrected on the basis of a difference between a reference value and an actual value of a parameter correlated with an amount of air in a cylinder.

According to an aspect of the invention, there is provided a control device for an internal combustion engine, including: an electronic control unit configured to a) calculate a fuel injection correction value on the basis of a first difference, the first difference being a difference between a predetermined reference amount of heat production and an actual amount of heat production, b) control an amount of fuel injection on the basis of the fuel injection correction value, c) calculate an intake air correction value on the basis of a second difference and any one of displacement of the amount of fuel injection and the fuel injection correction value, the second difference being a difference between a predetermined gradient of the reference amount of heat production and a gradient of the actual amount of heat production, the displacement of the amount of fuel injection being calculated on the basis of the first difference, and d) control an amount of intake air on the basis of the intake air correction value.

The reference amount of heat production is an amount of heat production when ideal combustion (for example, ideal combustion for obtaining requested torque) is performed, and may be set on the basis of a predetermined amount of fuel injection.

The gradient of the reference amount of heat production is a gradient of the amount of heat production when ideal combustion is performed, and may be set on the basis of a predetermined amount of intake air and a predetermined amount of fuel injection.

This solution is based on a correlation between the "difference between the reference amount of heat production and the actual amount of heat production" and the "surplus/shortage of the amount of fuel injection". The fuel injection correction value is calculated by considering that the amount of fuel injection is insufficient when the actual amount of heat production is smaller than the reference amount of heat production and considering that the amount of fuel injection is excessive when the actual amount of heat production is larger than the reference amount of heat production. The amount of fuel injection is controlled on the basis of the fuel injection correction value of the fuel injection control unit.

This solution is also based on a correlation between the "difference between the gradient of the reference amount of heat production and the gradient of the actual amount of heat production" and the "fuel injection displacement (displacement of the actual amount of fuel injection from an appropriate amount of fuel injection) or the fuel injection correction value" and the "surplus/shortage of the amount of intake air". That is, when the "difference in gradient" and the "displacement in the amount of fuel injection or the fuel injection correction value" are calculated, it is possible to calculate the "surplus/shortage of the amount of intake air". The intake air correction value is calculated on the basis of the surplus/shortage of the amount of intake air and the amount of intake air is controlled on the basis of the intake air correction value of the intake air control unit.

In this way, it is possible to independently adjust the amount of fuel injection and the amount of intake air by individually calculating the fuel injection correction value and the intake air correction value and individually performing injected fuel control based on the fuel injection correction value of the fuel injection control unit and air intake control based on the intake air correction value of the air intake control unit.

When the reference amount of heat production and the gradient of the reference amount of heat production are set to correspond to a combustion state in which an appropriate amount of fuel injection and an appropriate amount of intake air are obtained and a target air-fuel ratio is achieved, it is possible to cause the actual air-fuel ratio to approach or match the target air-fuel ratio while individually performing the fuel injection control and the air intake control.

The electronic control unit may be configured to calculate the displacement of the amount of fuel injection by dividing the first difference by heat production efficiency which is an amount of heat production per unit volume of fuel, and the electronic control unit may be configured to calculate the fuel injection correction value on the basis of the displacement of the amount of fuel injection.

That is, in order to convert the difference (for example, the unit is "J") between the reference amount of heat production and the actual amount of heat production into the displacement (volume) of the amount of fuel injection, the difference is divided by the heat production efficiency (for example, the unit is "J/mm$^3$"). Accordingly, it is possible to easily calculate the displacement (volume) of the amount of fuel injection from the difference in the amount of heat production.

The electronic control unit may be configured to calculate the displacement of the amount of fuel injection by dividing the first difference by heat production efficiency which is an amount of heat production per unit volume of fuel, the electronic control unit may be configured to calculate displacement of the amount of intake air on the basis of the displacement of the amount of fuel injection, an actual amount of intake air, and an actual amount of fuel injection, and the electronic control unit may be configured to calculate the intake air correction value on the basis of the displacement of the amount of intake air.

The gradient of the amount of heat production is affected by the amount of intake air and the amount of fuel injection. For example, the larger the amount of intake air becomes, the larger the gradient of the amount of heat production becomes. The larger the amount of fuel injection becomes, the larger the gradient of the amount of heat production becomes. Accordingly, the difference between the gradient of the reference amount of heat production and the gradient of the actual amount of heat production is correlated with the displacement of the amount of fuel injection, the displacement of the amount of intake air, the actual amount of intake air, and the actual amount of fuel injection. Accordingly, the displacement of the amount of intake air can be calculated on the basis of the difference between the gradient of the reference amount of heat production and the gradient of the actual amount of heat production, the displacement of the amount of fuel injection, the actual amount of intake air, and the actual amount of fuel injection. When the displacement of the amount of intake air is calculated, the intake air correction value can be set on the basis thereof. In this way, in this solution, the intake air correction value is set using the fact that the gradient of the amount of heat production, the amount of intake air, and the amount of fuel injection affect each other. Accordingly, it is possible to calculate the intake air correction value with high accuracy.

The electronic control unit may be configured to set the intake air correction value such that even when the second difference is equal to any one of the displacement of the amount of fuel injection and the fuel injection correction value, the intake air correction value when a temperature in a combustion chamber in a fuel injection period is equal to or higher than a premixed combustion start temperature of the fuel and less than a diffusive combustion start temperature of the fuel is smaller than the intake air correction value when the temperature in the combustion chamber in the fuel injection period is equal to or higher than the diffusive combustion start temperature of the fuel.

When the temperature in the combustion chamber in the fuel injection period is equal to or higher than the premixed combustion start temperature of the fuel and less than the diffusive combustion start temperature of the fuel, most of the injected fuel is provided for premixed combustion. On the other hand, when the temperature in the combustion chamber in the fuel injection period is equal to or higher than the diffusive combustion start temperature of the fuel, most of the injected fuel is provided for diffusive combustion. The premixed combustion is more greatly affected by the amount of oxygen than the diffusive combustion (since the fuel is combusted in a state where the temperature in the combustion chamber is relatively low, the amount of oxygen in the combustion chamber greatly affects the promotion of combustion). That is, in the premixed combustion, a large variation in the gradient of the actual amount of heat production appears even when the displacement of the amount of intake air is relatively small (greater than in the diffusive combustion). Accordingly, when most of the injected fuel is provided for the premixed combustion, it is necessary to correct the amount of intake air by considering that the premixed combustion is more greatly affected by the amount of oxygen than when most of the injected fuel is provided for the diffusive combustion. Accordingly, when the temperature in the combustion chamber in the fuel injection period is equal to or higher than the premixed combustion start temperature of the fuel and less than the diffusive combustion start temperature of the fuel, the displacements of the gradients of the amounts of heat production are equal to the displacement of the amount of fuel injection (or the fuel injection correction value), but the intake air correction value is set to be smaller than when the temperature in the combustion chamber in the fuel injection period is equal to or higher than the diffusive combustion start temperature of the fuel. Accordingly, it is possible to adjust an amount of intake air depending on the combustion type of the fuel.

According to the invention, it is possible to adjust the amount of fuel injection and the amount of intake air by individually correcting the amount of fuel injection and the amount of intake air.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In this embodiment, the invention is applied to a common-rail in-cylinder direct injection type multi-cylinder (for example, in-line 4 cylinders) diesel engine (compression self-ignition internal combustion engine) mounted on an automobile.

—Configuration of Engine—

Figure 1:
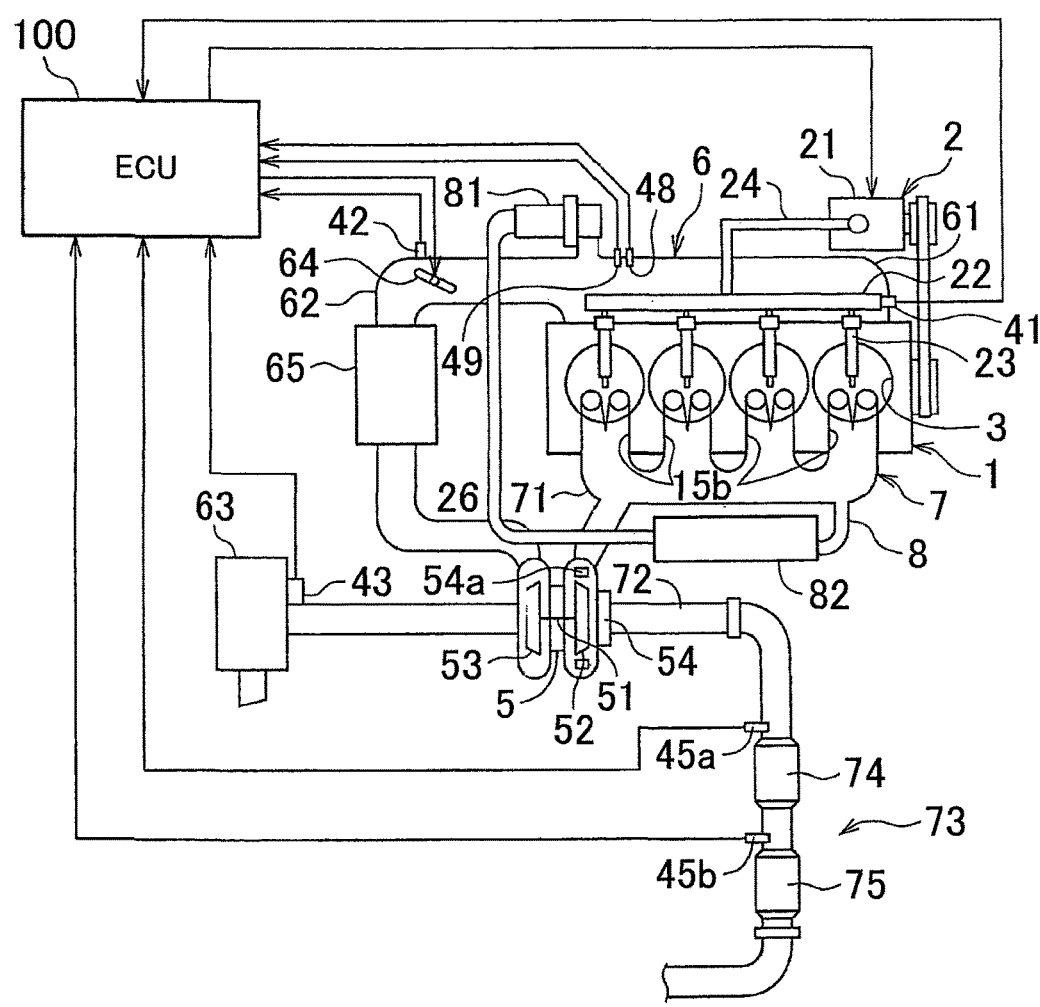
FIG. 1 is a diagram schematically illustrating a configuration of a diesel engine and a control system thereof according to an embodiment of the invention.

FIG. 1 is a is a diagram schematically illustrating a configuration of a diesel engine 1 (hereinafter, simply referred to as engine) and a control system thereof according to this embodiment.

As illustrated in FIG. 1, the engine 1 according to this embodiment is constituted as a diesel engine system including a fuel supply system 2, a combustion chamber 3, an intake system 6, an exhaust system 7, and the like as principal parts.

The fuel supply system 2 includes a supply pump 21, a common rail 22, injectors (fuel injection valve) 23, and an engine fuel passage 24.

The supply pump 21 converts fuel pumped from a fuel tank into a high pressure and then supplies the high-pressure fuel to the common rail 22 via the engine fuel passage 24. The common rail 22 has a function of a compression chamber holding (compressing) the high-pressure fuel at a predetermined pressure and distributes the compressed fuel to the injectors 23, 23, . . . . The injector (the fuel injection control unit) 23 is a piezoelectric injector including a piezoelectric element therein and can adjust an amount of fuel injection into the combustion chamber 3 by controlling a valve-opening period.

The intake system 6 includes an intake manifold 61 connected to an intake port 15a formed in a cylinder head 15 (see FIG. 2) and an intake air pipe 62 is connected to the intake manifold 61. In the intake system 6, an air cleaner 63, an air flow meter 43, and an intake throttle valve (diesel throttle) 64 are arranged sequentially from the upstream side.

The exhaust system 7 includes an exhaust manifold 71 connected to an exhaust port 15b formed in the cylinder head 15 and an exhaust gas pipe 72 is connected to the exhaust manifold 71. An exhaust gas control unit 73 is disposed in the exhaust system 7. The exhaust gas control unit 73 is provided with an NOx storage reduction (NSR) catalyst 74 as an NOx occlusion reduction type catalyst and a diesel particulate filter (DPF) 75.

Figure 2:
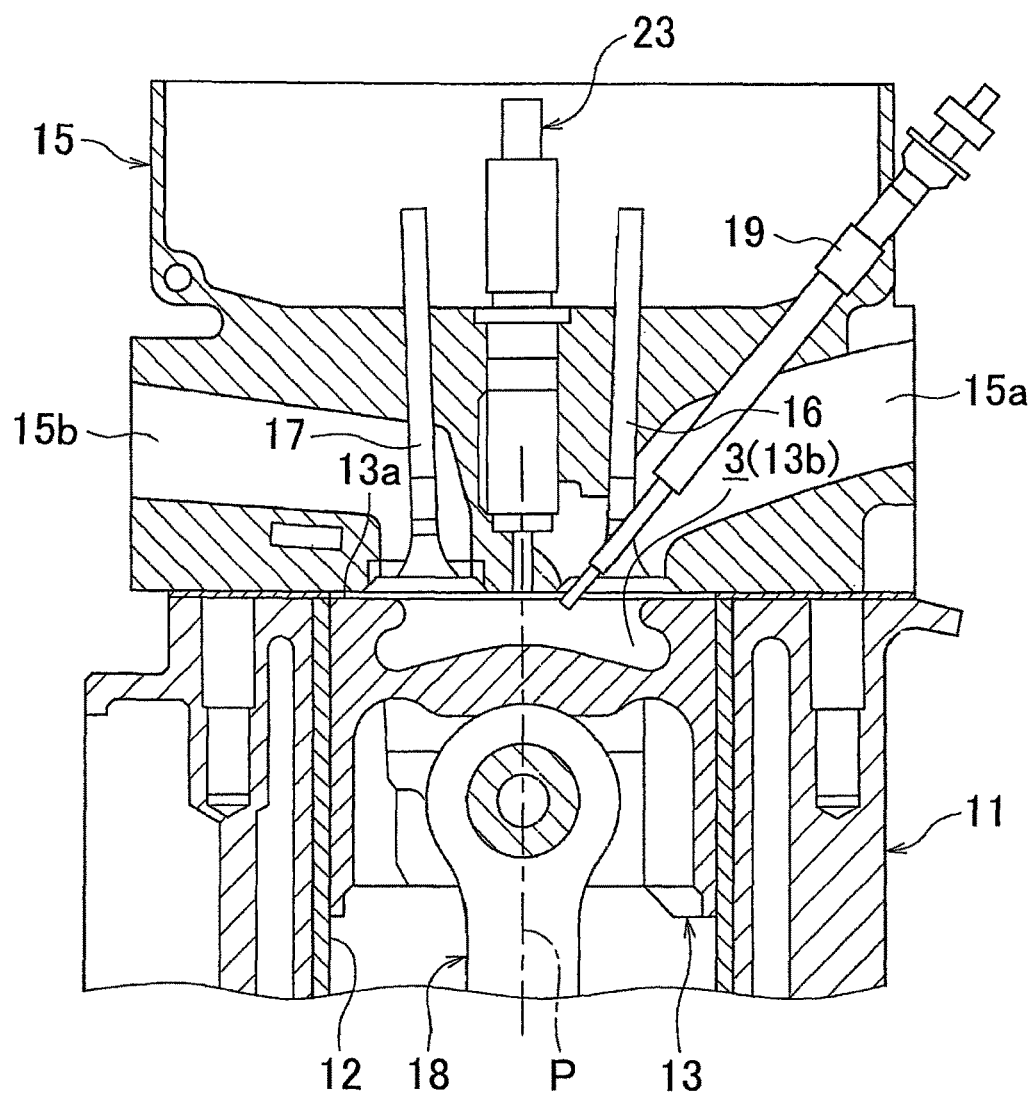
FIG. 2 is a cross-sectional view illustrating a combustion chamber of a diesel engine and a periphery thereof.

As illustrated in FIG. 2, in a cylinder block 11, a cylinder bore 12 is formed for each cylinder (four cylinders) and a piston 13 is housed in each cylinder bore 12 so as to be slidable in the vertical direction.

The combustion chamber 3 is formed on the top surface 13a of the piston 13. That is, the combustion chamber 3 is defined by the bottom surface of the cylinder head 15 attached to the upper part of the cylinder block 11, the inner wall surface of the cylinder bore 12, and the top surface 13a of the piston 13. A cavity (recessed portion) 13b is formed substantially at the center of the top surface 13a of the piston 13, and the cavity 13b also constitutes a part of the combustion chamber 3.

The cavity 13b has a shape in which the recess size is small at the central portion (in the cylinder central line P) and the recess size increases toward the outer circumference.

The piston 13 is connected to a crank shaft which is an engine output shaft via a connecting rod 18. A glow plug 19 is disposed to face the combustion chamber 3.

An intake valve 16 for shutting or opening the intake port 15a and an exhaust valve 17 for shutting or opening the exhaust port 15b are disposed in the cylinder head 15.

As illustrated in FIG. 1, the engine 1 is provided with a supercharger (turbocharger) 5. The turbocharger 5 includes a turbine wheel 52 and a compressor wheel 53 connected to each other via a turbine shaft 51. The turbocharger 5 in this embodiment is a variable-nozzle turbocharger and a variable nozzle vane mechanism 54 is disposed on the turbine wheel 52 side. The variable nozzle vane mechanism 54 includes plural nozzle vanes 54a, 54a, . . . causing a channel area of an exhaust gas channel of the turbine housing to vary and an actuator (not illustrated) changing the opening of the nozzle vanes 54a. The channel area (throat area) between the neighboring nozzle vanes 54a, 54a is changed by changing the opening of the nozzle vanes 54a using the actuator. By changing the throat area, the flow rate of exhaust gas introduced into the turbine wheel 52 is adjusted and the rotation speeds of the turbine wheel 52 and the compressor wheel 53 are adjusted, thereby adjusting the supercharging pressure.

The intake pipe 62 is provided with an intercooler 65 for cooling the intake air of which the temperature is raised by the supercharging by the turbocharger 5.

The engine 1 is provided with an exhaust gas recirculation passage (EGR passage) 8 for appropriately recirculating a part of the exhaust gas to the intake system 6. The EGR passage 8 is provided with an EGR valve 81 and an EGR cooler 82.

—ECU—

Figure 3:
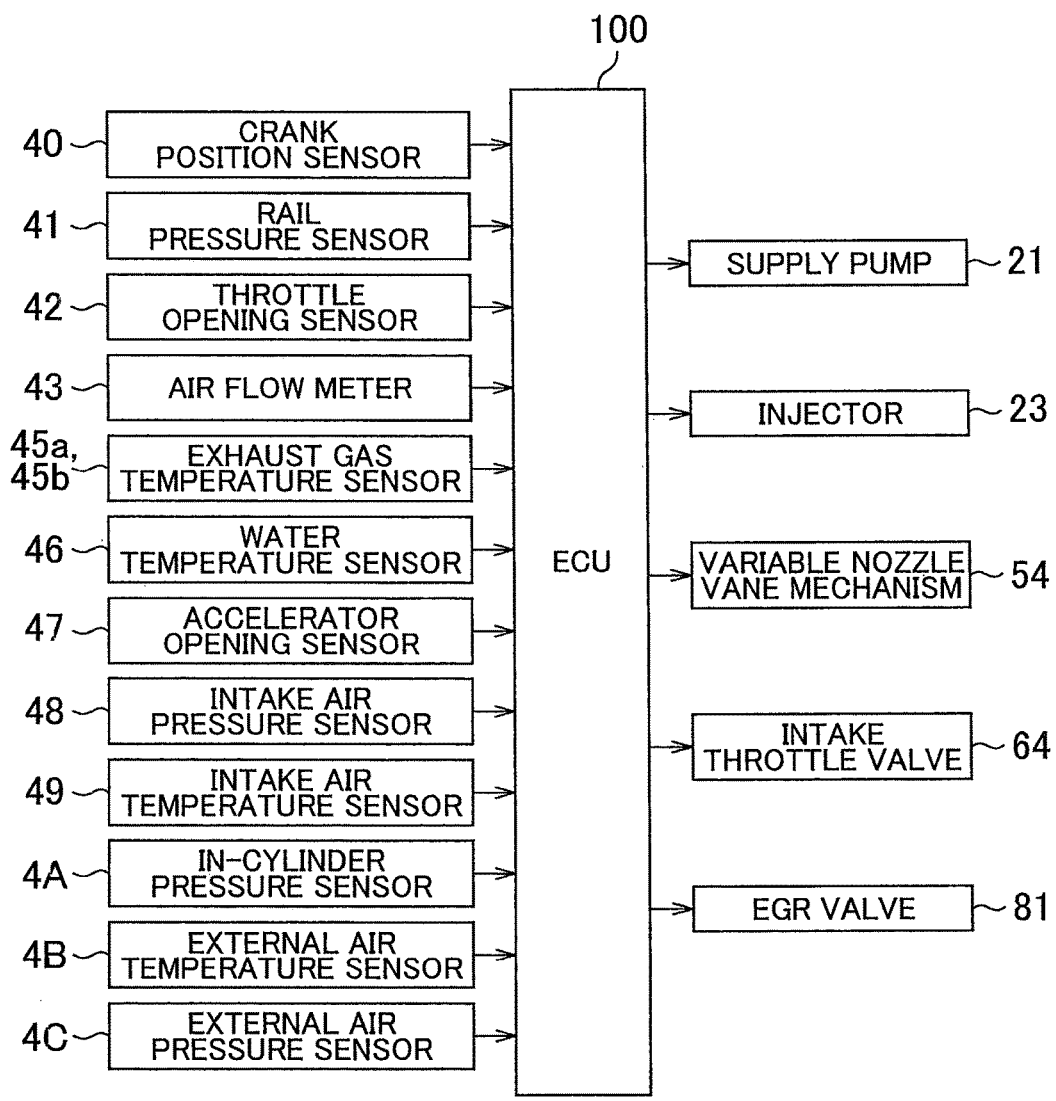
FIG. 3 is a block diagram illustrating a configuration of a control system such as an ECU.

The ECU 100 includes a microcomputer including a CPU, a ROM, and a RAM which are not illustrated and an input and output circuit. As illustrated in FIG. 3, the input circuit of the ECU 100 is connected to a crank position sensor 40, a rail pressure sensor 41, a throttle opening sensor 42, an air flow meter 43, exhaust gas temperature sensors 45a, 45b, a water temperature sensor 46, an accelerator opening sensor 47, an intake air pressure sensor 48, an intake air temperature sensor 49, an in-cylinder pressure sensor 4A, an external air temperature sensor 4B, and an external air pressure sensor 4C.

On the other hand, the output circuit of the ECU 100 is connected to the supply pump 21, the injector 23, the variable nozzle vane mechanism 54, the intake throttle valve 64, and the EGR valve 81.

The ECU 100 performs a variety of control of the engine 1 on the basis of the outputs from the above-mentioned sensors, calculated values obtained by calculation expressions using the output values, or various maps stored in the ROM.

For example, the ECU 100 performs pilot injection and main injection as the fuel injection control of the injector 23.

The pilot injection is an operation of injecting a small amount of fuel in advance before the main injection from the injector 23. The pilot injection is an injection operation for suppressing ignition delay of fuel by the main injection and guiding the combustion to stable diffusive combustion and is also called sub injection. The pilot injection has a function of suppressing an initial combustion rate by the main injection and a function of preheating the temperature in the cylinder. That is, after the pilot injection is performed, the fuel injection is temporarily stopped and the compressed gas temperature (the temperature in the cylinder) is satisfactorily raised to reach a self-ignition temperature of the fuel (for example, 1000 K) until the main injection is started, whereby ignitability of fuel injected by the main injection is secured well.

The main injection is an injection operation (operation of supplying torque-generating fuel) for generating torque of the engine 1. The amount of fuel injection in the main injection is basically determined to obtain a request torque depending on the engine rotation speed, the accelerator pressure, the coolant temperature, the intake air temperature, and the like. For example, the higher the engine rotation speed (the engine rotation speed calculated on the basis of the detection value of the crank position sensor 40) becomes and the larger the accelerator pressure (the pressure applied to the accelerator pedal detected by the accelerator opening sensor 47) becomes, the greater the torque request value of the engine 1 becomes and thus the larger the amount of fuel injection in the main injection is set to be.

Figure 4A:
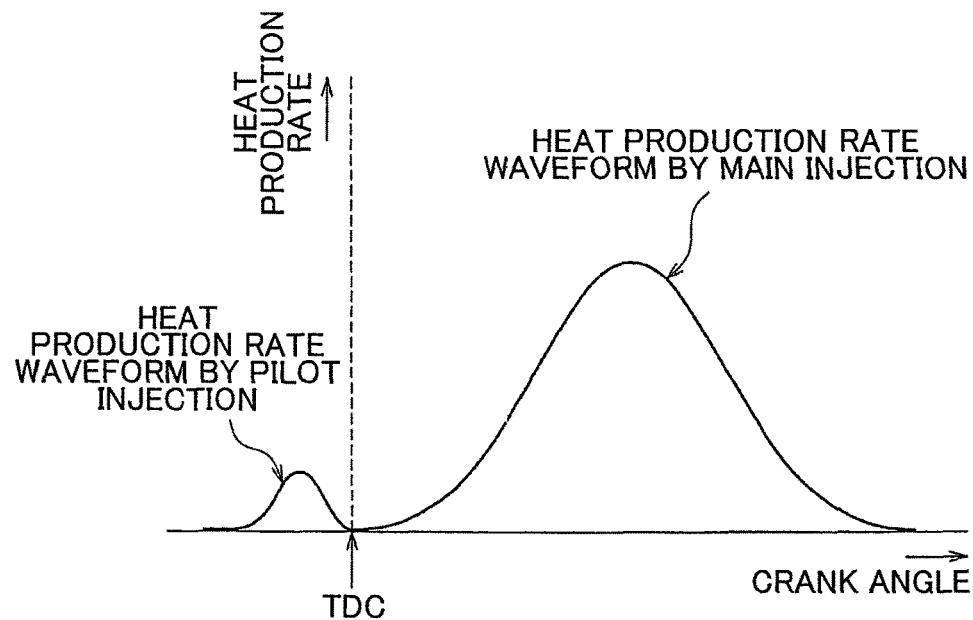
FIG. 4A is a waveform diagram illustrating a variation in a heat production rate (an amount of heat production per unit rotation angle of a crank shaft) in a combustion stroke and FIG. 4B is a waveform diagram illustrating a variation in a fuel injection rate (an amount of fuel injection per unit rotation angle of a crank shaft) in a combustion stroke.
Figure 4B:
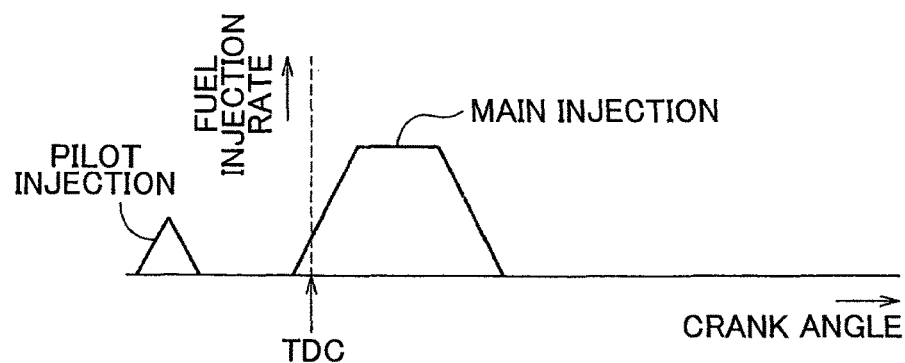

A heat production rate and a fuel injection rate in an expansion stroke will be described below. The waveform illustrated in FIG. 4A is an example of an ideal heat production rate relevant to combustion of fuel injected in the pilot injection and the main injection, where the horizontal axis represents a crank angle and the vertical axis represents the heat production rate. The waveform illustrated in FIG. 4B is a waveform of an injection rate of fuel (an amount of fuel injection per unit rotation angle of the crank shaft) injected from the injector 23. TDC in the drawing represents a crank angle position corresponding to a compression top dead center of the piston 13.

As illustrated in FIGS. 4A, 4B, first, when the pilot injection is performed, the inside of the cylinder is preheated by the combustion of fuel injected in the pilot injection. Thereafter, when the main injection is performed, the fuel injected in the main injection is immediately exposed to a temperature environment equal to or higher than the self-ignition temperature and is thermally decomposed, and the combustion (most of which is diffusive combustion) is started just after the injection.

In the ideal heat production rate waveform illustrated in FIG. 4A, for example, the combustion of fuel injected in the main injection is started from the compression top dead center (TDC) of the piston 13, the heat production rate reaches a maximum value (peak value) at a predetermined piston position (for example, 10 degrees after the compression top dead center (ATDC10°)) after the compression top dead center of the piston 13, and the combustion of fuel injected in the main injection is ended at a predetermined piston position (for example, 20 degrees after the compression top dead center (ATDC20°)) after the compression top dead center.

The ideal heat production rate waveform varies depending on an operation state quantity (such as an engine rotation speed) and an operation condition (such as a coolant temperature or an intake air temperature) of the engine 1. Plural ideal heat production rate waveforms corresponding to the operation state quantities and the operation conditions of the engine 1 are stored in advance in the ROM of the ECU 100.

The ECU 100 adjusts the amount of exhaust gas recirculated (EGR volume) toward the intake manifold 61 by controlling the opening of the EGR valve 81 depending on the operation state of the engine 1.

The ECU 100 adjusts the supercharging pressure by controlling the actuator of the variable nozzle vane mechanism 54 so as to adjust the opening of the nozzle vanes 54a, 54a, . . . . The amount of intake air introduced into the cylinder is controlled by the adjustment of the supercharging pressure. Accordingly, the turbocharger 5 including the variable nozzle vane mechanism 54 constitutes the air intake control unit in the claims.

—Control of Amount of Fuel Injection and Amount of Intake Air—

The control of an amount of fuel injection and an amount of intake air by which this embodiment is characterized will be described below.

The control of an amount of fuel, injection and amount of intake air will be first described in brief.

Brief Description of Control of Amount of Fuel Injection

The amount of fuel injection in this embodiment is determined depending on an fuel injection correction value calculated on the basis of a difference between a predetermined reference amount of heat production and an actual amount of heat production. That is, the amount of fuel injection is increased (when the actual amount of heat production is smaller than the reference amount of heat production) or decreased (when the actual amount of heat production is larger than the reference amount of heat production) by the fuel injection correction value, whereby an appropriate amount of fuel injection is obtained. Here, the appropriate amount of fuel injection is an amount of fuel injection which is considered as a target depending on the accelerator opening, the engine rotation speed, or the like, and is an amount of fuel injection for obtaining the above-mentioned ideal heat production rate waveform (the ideal heat production rate waveform depending on the accelerator opening, the engine rotation speed, or the like).

The reference amount of heat production is defined as an amount of heat production (which corresponds to the area of the ideal heat production rate waveform) when ideal combustion is performed in the combustion stroke. That is, the amount of heat production when an appropriate amount of fuel injection for realizing a target air-fuel ratio is obtained and ideal combustion with satisfactorily-high combustion efficiency is performed is the reference amount of heat production. That is, the reference amount of heat production is set on the basis of a predetermined amount of fuel injection. The ideal heat production rate waveform depending on the accelerator opening, the engine rotation speed, or the like is extracted from the ROM of the ECU 100 and the reference amount of heat production is defined on the basis of the extracted heat production rate waveform.

The actual amount of heat production is an amount of heat production (which corresponds to the area of the actual heat production rate waveform) when combustion is actually performed in the combustion stroke.

Accordingly, when the actual amount of heat production is less than the reference amount of heat production, the shortage corresponds to the shortage of the amount of fuel injection. In this case, the fuel injection correction value corresponding to the shortage is calculated and an amount of fuel injection increased by the fuel injection correction value is determined as a fuel injection command to the injector 23. On the contrary, when the actual amount of heat production is greater than the reference amount of heat production, the surplus corresponds to the surplus of the amount of fuel injection. In this case, the fuel injection correction value corresponding to the surplus is calculated and an amount of fuel injection decreased by the fuel injection correction value is determined as an injection command to the injector 23.

Brief Description of Control of Amount of Intake Air

The amount of intake air in this embodiment is determined depending on an intake air correction value calculated on the basis of a difference between a predetermined gradient of the reference amount of heat production (hereinafter, also referred to as reference heat production rate gradient) and a gradient of the actual amount of heat production (hereinafter, also referred to as actual heat production rate gradient) and the displacement of an amount of fuel injection calculated from the difference between the reference amount of heat production and the actual amount of heat production. That is, the amount of intake air is increased (for example, when the gradient of the actual amount of heat production is smaller than the gradient of the reference amount of heat production in the situation in which an appropriate amount of fuel injection is obtained) or decreased (for example, when the gradient of the actual amount of heat production is larger than the gradient of the reference amount of heat production in the situation in which an appropriate amount of fuel injection is obtained) by the intake air correction value, whereby an appropriate amount of intake air is obtained. Here, the appropriate amount of intake air is an amount of intake air which is considered as a target depending on the accelerator opening, the engine rotation speed, or the like, and is an amount of intake air for obtaining the above-mentioned ideal heat production rate waveform (the ideal heat production rate waveform depending on the accelerator opening, the engine rotation speed, or the like).

The gradient of the reference amount of heat production is defined as the gradient of the heat production rate waveform when ideal combustion is performed in the combustion stroke. That is, the gradient of the heat production rate waveform when an appropriate amount of fuel injection for realizing a target air-fuel ratio is obtained and ideal combustion with satisfactorily-high combustion efficiency is performed is the gradient of the reference amount of heat production. That is, the gradient of the reference amount of heat production is set on the basis of a predetermined amount of intake air and a predetermined amount of fuel injection. The ideal heat production rate waveform depending on the accelerator opening, the engine rotation speed, or the like is extracted from the ROM of the ECU 100 and the gradient of the reference amount of heat production is defined on the basis of the extracted heat production rate waveform.

The gradient of the actual amount of heat production is the gradient of the actual heat production rate waveform when combustion is actually performed in the combustion stroke.

The gradient of the actual amount of heat production is affected by both the amount of fuel injection and the amount of intake air. That is, the gradient of the actual amount of heat production varies depending on the difference between the appropriate amount of fuel injection and the actual amount of fuel injection and the difference between the appropriate amount of intake air and the actual amount of intake air. The intake air correction value is calculated in consideration thereof and the amount of intake air is determined depending thereon. This will be specifically described below.

—When Appropriate Amount of Fuel Injection is Obtained—

When an appropriate amount of fuel injection depending on the accelerator opening, the engine rotation speed, or the like is obtained but the amount of intake air is less than the appropriate amount of intake air, the gradient of the actual amount of heat production is smaller than the gradient of the reference amount of heat production. The difference in gradient corresponds to the shortage of the amount of intake air. In this case, an intake air correction value corresponding to the shortage is calculated and an amount of intake air increased by the intake air correction value is determined as the target amount of intake air.

On the other hand, when an appropriate amount of fuel injection is obtained but the amount of intake air is greater than that is appropriate, the gradient of the actual amount of heat production is larger than the gradient of the reference amount of heat production. The difference in gradient corresponds to the surplus of the amount of intake air. In this case, an intake air correction value corresponding to the surplus is calculated and an amount of intake air decreased by the intake air correction value is determined as the target amount of intake air.

—When Amount of Fuel Injection is Less than that is Appropriate—

When the amount of fuel injection is less than that is appropriate (when the actual amount of heat production is less than the reference amount of heat production) and the amount of intake air is less than that is appropriate, the gradient of the actual amount of heat production is less than the gradient of the reference amount of heat production. In this case, the gradient of the actual amount of heat production is still less than the gradient with the difference (difference from the gradient of the reference amount of heat production) corresponding to the shortage of the amount of fuel injection. The difference of the gradient of the actual amount of heat production from the gradient with the difference corresponding to the shortage of the amount of fuel injection corresponds to the shortage of the amount of intake air. In this case, an intake air correction value corresponding to the shortage is calculated and an amount of intake air increased by the intake air correction value is determined as the target amount of intake air.

On the other hand, when the amount of fuel injection is less than that is appropriate and the amount of intake air is greater than that is appropriate, the gradient of the actual amount of heat production is larger than the gradient with the difference (difference from the gradient of the reference amount of heat production) corresponding to the shortage of the amount of fuel injection. The difference of the gradient of the actual amount of heat production from the gradient with the difference corresponding to the shortage of the amount of fuel injection corresponds to the surplus of the amount of intake air. In this case, an intake air correction value corresponding to the surplus is calculated and an amount of intake air decreased by the intake air correction value is determined as the target amount of intake air.

—When Amount of Fuel Injection is Greater than that is Appropriate—

When the amount of fuel injection is greater than that is appropriate (when the actual amount of heat production is greater than the reference amount of heat production) and the amount of intake air is greater than that is appropriate, the gradient of the actual amount of heat production is larger than the gradient of the reference amount of heat production. In this case, the gradient of the actual amount of heat production is still larger than the gradient with the difference (difference from the gradient of the reference amount of heat production) corresponding to the surplus of the amount of fuel injection. The difference of the gradient of the actual amount of heat production from the gradient with the difference corresponding to the surplus of the amount of fuel injection corresponds to the surplus of the amount of intake air. In this case, an intake air correction value corresponding to the surplus is calculated and an amount of intake air decreased by the intake air correction value is determined as the target amount of intake air.

On the other hand, when the amount of fuel injection is greater than that is appropriate and the amount of intake air is less than that is appropriate, the gradient of the actual amount of heat production is smaller than the gradient with the difference (difference from the gradient of the reference amount of heat production) corresponding to the surplus of the amount of fuel injection. The difference of the gradient of the actual amount of heat production from the gradient with the difference corresponding to the surplus of the amount of fuel injection corresponds to the shortage of the amount of intake air. In this case, an intake air correction value corresponding to the shortage is calculated and an amount of intake air increased by the intake air correction value is determined as the target amount of intake air.

As described above, in this embodiment, the amount of fuel injection is determined depending on the fuel injection correction value calculated on the basis of the difference between the reference amount of heat production and the actual amount of heat production, and the amount of intake air is determined depending on the intake air correction value calculated on the basis of the difference between the gradient of the reference amount of heat production and the gradient of the actual amount of heat production and the displacement of the amount of fuel injection. That is, the control device according to the invention is constituted by the configuration for determining the amount of fuel injection and the configuration of the amount of intake air in the ECU 100. In the control device according to the invention, examples of the input include information of the operation state quantity of the engine 1 such as an engine rotation speed, an accelerator opening, or the in-cylinder pressure and information the operation condition such as a coolant temperature or an intake air temperature. The input is not limited to these examples, but other information required for calculating the amount of fuel injection and the amount of intake air may be used. Examples of the output of the control device include an output signal (a command signal to the injector 23) for obtaining the amount of fuel injection increased or decreased by the fuel injection correction value calculated as described above and an output signal (an opening command signal to the actuator of the variable nozzle vane mechanism 54) for obtaining the amount of intake air increased or decreased by the intake air correction value calculated as described above.

Plural embodiments of the control of an amount of fuel injection and an amount of intake air will be specifically described below.

First Embodiment

A first embodiment will be first described. In this embodiment, the combustion of fuel injected in the main injection will be described when most of the fuel injected in the main injection is subjected to the diffusive combustion as described above.

Figure 5:
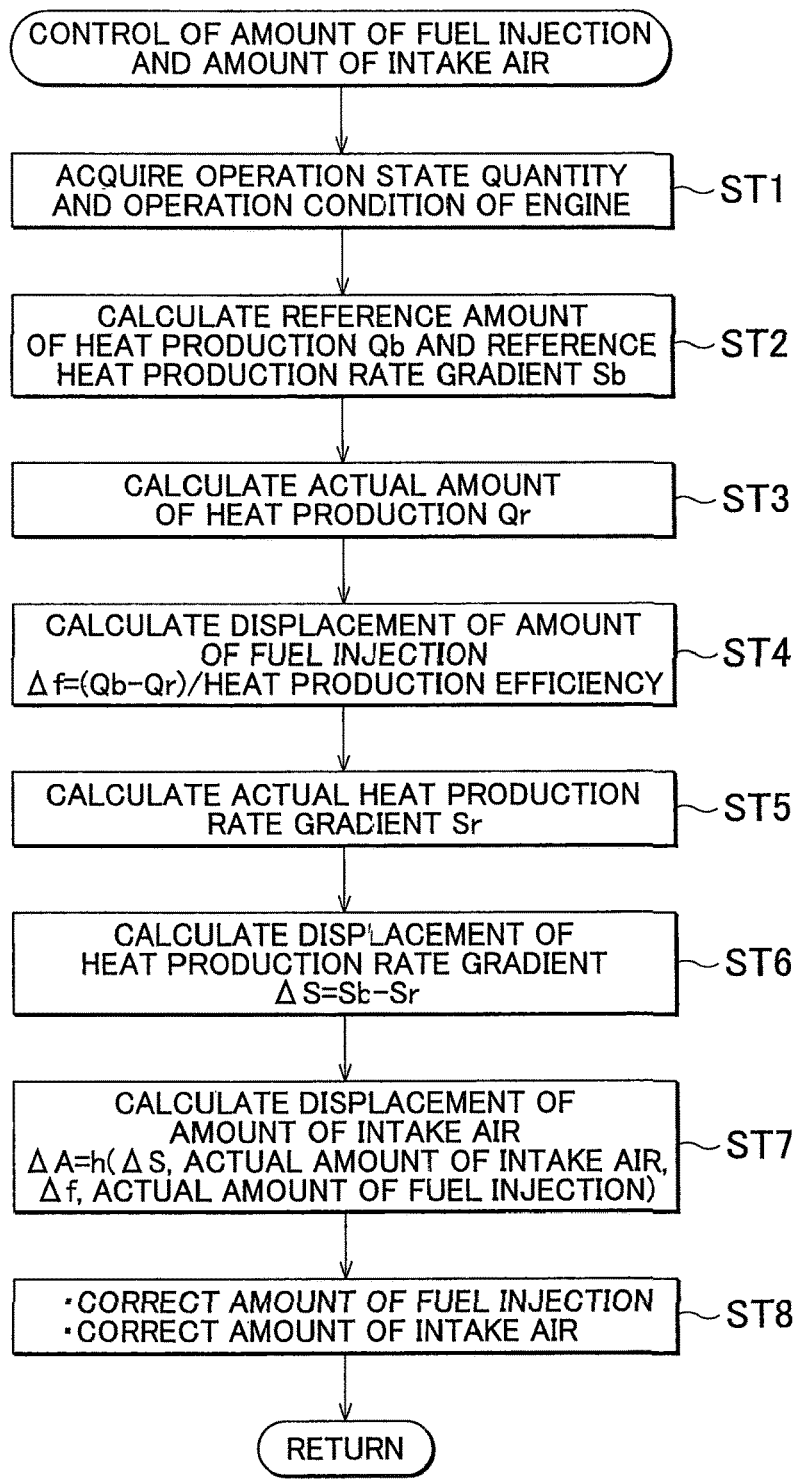
FIG. 5 is a flowchart illustrating a control flow of an amount of fuel injection and an amount of intake air.

FIG. 5 is a flowchart illustrating a control flow of an amount of fuel injection and an amount of intake air. The flowchart is performed whenever a combustion stroke is performed in any cylinder after the engine 1 is started.

First, in step ST1, the operation state quantity and the operation condition of the engine 1 are acquired. Examples of the operation state quantity of the engine 1 include the engine rotation speed calculated on the basis of the detection value of the crank position sensor 40, the accelerator opening detected by the accelerator opening sensor 47, and the in-cylinder pressure detected by the in-cylinder pressure sensor 4A. Examples of the operation condition of the engine 1 include the coolant temperature detected by the water temperature sensor 46 and the intake air temperature detected by the intake air temperature sensor 49.

Thereafter, in step ST2, the reference amount of heat production Qb and the reference heat production rate gradient Sb are calculated. As described above, plural ideal heat production rate waveforms depending on the operation state quantities and the operation conditions of the engine 1 are stored in advance in the ROM. In step ST2, the ideal heat production rate waveform depending on the operation state quantity and the operation condition of the engine 1 acquired in step ST1 is read from the ROM and the reference amount of heat production Qb and the reference heat production rate gradient Sb are calculated on the basis of the ideal heat production rate waveform.

For example, in the heat production rate waveform (the ideal heat production rate waveform) based on the main injection in FIG. 4A, the area of the heat production rate waveform corresponds to the reference amount of heat production Qb and the slope in the period in which the heat production rate increases corresponds to the reference heat production rate gradient Sb.

At the time of calculating the reference amount of heat production Qb and the reference heat production rate gradient Sb, the ideal heat production rate waveform is approximated to an equilateral triangle, the area of the equilateral triangle is set as the reference amount of heat production Qb, and the slope of a hypotenuse of the equilateral triangle (a hypotenuse in the period in which the heat production rate gradient increases) is set as the reference heat production rate gradient Sb. An example of a method of approximating the heat production rate waveform to the equilateral triangle is a method of geometrically calculating the equilateral triangle by acquiring the combustion start time and the peak time and the peak value of the heat production rate.

After the reference amount of heat production Qb and the reference heat production rate gradient Sb are calculated, the displacement of an amount of fuel injection Δf in steps ST3, ST4, and the displacement of an amount of intake air ΔA is calculated in steps ST5 to ST7.

In step ST3, the actual amount of heat production Qr is calculated. The actual amount of heat production Qr is calculated on the basis of the variation in the in-cylinder pressure detected by the in-cylinder pressure sensor 4A. Specifically, since there is a correlation between the heat production rate in a cylinder and the in-cylinder pressure (the higher the heat production rate becomes, the higher the in-cylinder pressure becomes), an actual heat production rate waveform is prepared on the basis of the variation in the in-cylinder pressure detected by the in-cylinder pressure sensor 4A and the area of the actual heat production rate waveform is calculated as the actual amount of heat production Qr. For example, the prepared actual heat production rate waveform is approximated to a equilateral triangle as described above and the area of the equilateral triangle is set as the actual amount of heat production Qr. The actual amount of heat production Qr may be calculated by integrating the variation in the in-cylinder pressure detected by the in-cylinder pressure sensor 4A in the combustion stroke period.

Thereafter, in step ST4, the displacement of an amount of fuel injection Δf is calculated using Expression (1).

$$\Delta f = (Qb - Qr)/\text{heat production efficiency} \quad (1)$$

In this way, by dividing a value (difference in the heat production rate of which the unit is "J") obtained by subtracting the actual amount of heat production Qr from the reference amount of heat production Qb by heat production efficiency (of which the unit is "J/mm$^3$"), the displacement of an amount of fuel injection Δf (of which the unit is "mm$^3$") is calculated.

Here, the heat production efficiency is an amount of heat production per unit volume of fuel and is, for example, 30 J/mm$^3$. This value is the maximum value (reference heat production efficiency) of the amount of heat production per unit volume of light oil, which is a value obtained experimentally.

Figure 6:
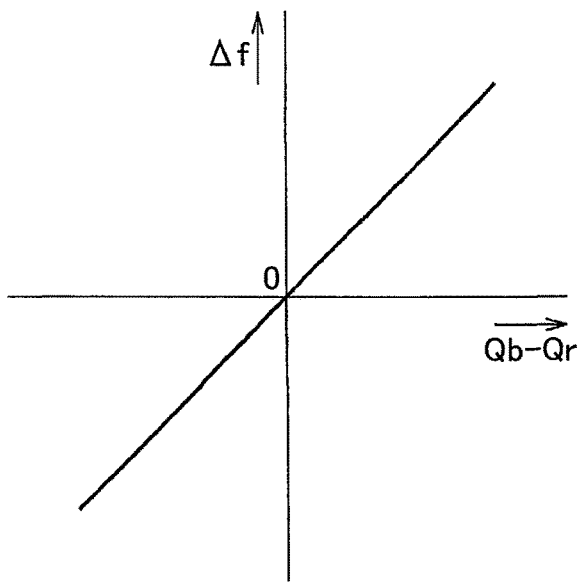
FIG. 6 is a diagram illustrating a map for calculating displacement of an amount of fuel injection Δf from a difference between a reference amount of heat production Qb and an actual amount of heat production Qr.

The displacement of an amount of fuel injection Δf may be calculated from a map illustrated in FIG. 6. This map is used to calculate the displacement of an amount of fuel injection Δf from the difference between the reference amount of heat production Qb and the actual amount of heat production Qr, is prepared in advance by experiment or simulation, and is stored in the ROM of the ECU 100.

Then, in step ST5, the actual heat production rate gradient Sr is calculated. The actual heat production rate gradient Sr is calculated on the basis of the variation in the in-cylinder pressure detected by the in-cylinder pressure sensor 4A. Specifically, the gradient of the heat production rate in a period from the combustion start to the time at which the heat production rate reaches the maximum value (peak value) is calculated as the actual heat production rate gradient Sr depending on the actual heat production rate waveform calculated in step ST3. That is, as described above, the actual heat production rate waveform is approximated to an equilateral triangle and the gradient of the hypotenuse of the equilateral triangle is calculated as the actual heat production rate gradient Sr.

Thereafter, in step ST6, the displacement of a heat production rate gradient ΔS is calculated using Expression (2).

$$\Delta S = Sb - Sr \quad (2)$$

Then, in step ST7, the displacement of an amount of intake air ΔA is calculated using Expression (3) (calculation expression using a function h).

$$\Delta A = h(\Delta S, \text{actual amount of intake air}, \Delta f, \text{actual amount of fuel injection}) \quad (3)$$

Here, the actual amount of intake air is an amount of intake air detected by the air flow meter 43. The actual amount of fuel injection is calculated from the product of a fuel pressure detected by the rail pressure sensor 41 and the valve-opening period of the injector 23.

Expression (3) will be described below.

First, as described above, since the heat production rate gradient is affected by the amount of intake air (oxygen density) and the amount of fuel injection (amount of fuel), the reference heat production rate gradient can be given by Expression (3-1).

$$\text{reference heat production rate gradient} = \alpha \times \text{oxygen density} \times \text{amount of fuel} \quad (3\text{-}1)$$

In this case, when the operation state quantity and the operation condition are fixed, the in-cylinder volume and the oxygen density are also fixed and thus Expression (3-2) is established.

$$\text{oxygen density} = \beta \times \text{amount of air} \quad (3\text{-}2)$$

Expression (3-3) is established from Expression (3-1) and Expression (3-2).

$$\text{reference heat production rate gradient} = \gamma \times \text{amount of fuel} \quad (3\text{-}3)$$

On the other hand, the actual heat production rate gradient can be obtained from Expression (3-4).

$$\text{actual heat production rate gradient} = \gamma \times \text{actual amount of air} \times \text{actual amount of fuel} \quad (3\text{-}4)$$

Here, α, β, and γ are constants.

Expression (3-5) is established from Expression (3-3) and Expression (3-4).

$$\Delta S = g(\Delta A, \text{actual amount of intake air}, \Delta f, \text{actual amount of fuel injection}) \quad (3\text{-}5)$$

That is, the displacement of a heat production rate gradient ΔS can be calculated by a function g having the displacement of an amount of intake air ΔA, the actual amount of intake air, the displacement of an amount of fuel injection Δf, and the actual amount of fuel injection as variables.

Figure 7:
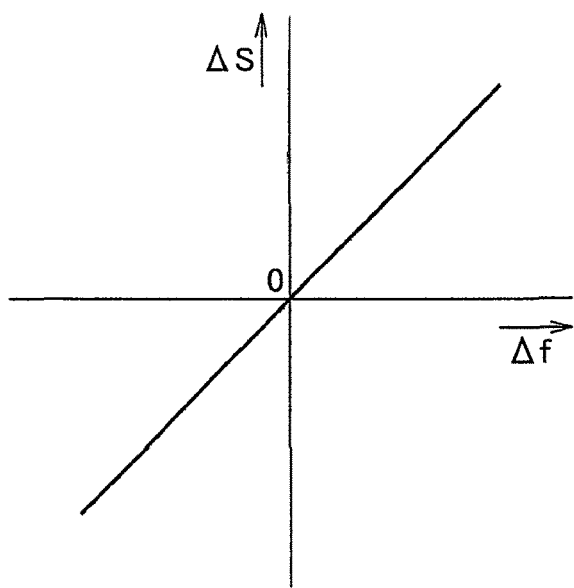
FIG. 7 is a diagram illustrating a relationship between the displacement of an amount of fuel injection Δf and displacement of a heat production rate gradient ΔS when an amount of intake air is fixed.
Figure 8:
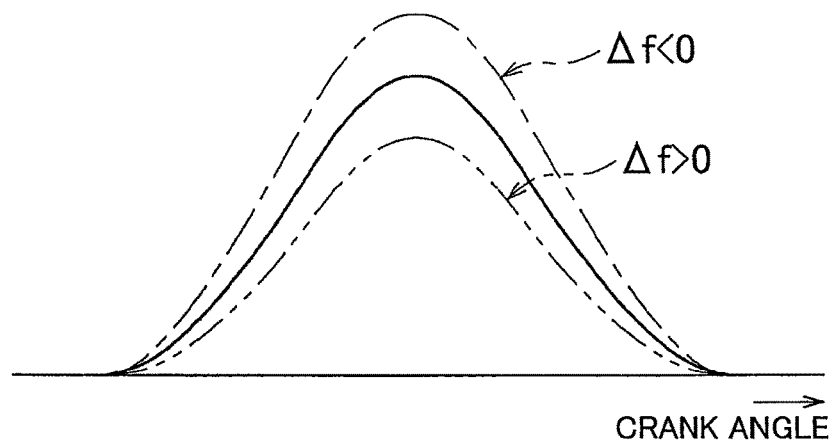
FIG. 8 is a diagram illustrating a relationship between the displacement of an amount of fuel injection and a heat production rate waveform.

Here, the displacement of an amount of fuel injection Δf and the displacement of a heat production rate gradient ΔS have the relationship illustrated in FIG. 7. FIG. 7 is a diagram illustrating a relationship between the displacement of an amount of fuel injection Δf and the displacement of a heat production rate gradient ΔS when the amount of intake air is fixed. That is, the larger the displacement of an amount of fuel injection Δf becomes (the less the actual amount of heat production Qr is than the reference amount of heat production Qb), the larger the displacement of a heat production rate gradient ΔS becomes (the smaller the actual heat production rate gradient Sr is than the reference heat production rate gradient Sb). From the viewpoint of using the heat production rate waveform, when the displacement of an amount of fuel injection Δf has a minus value in the ideal heat production rate waveform (solid line), that is, the actual amount of fuel injection is great, as illustrated in FIG. 8, the area of the heat production rate waveform increases as indicated by a one-dot chain line in the drawing. The heat production rate gradient increases. On the other hand, when the displacement of an amount of fuel injection Δf has a plus value, that is, the actual amount of fuel injection is small, the area of the heat production rate waveform decreases as indicated by a two-dot chain line in the drawing. The heat production rate gradient decreases.

Figure 9:
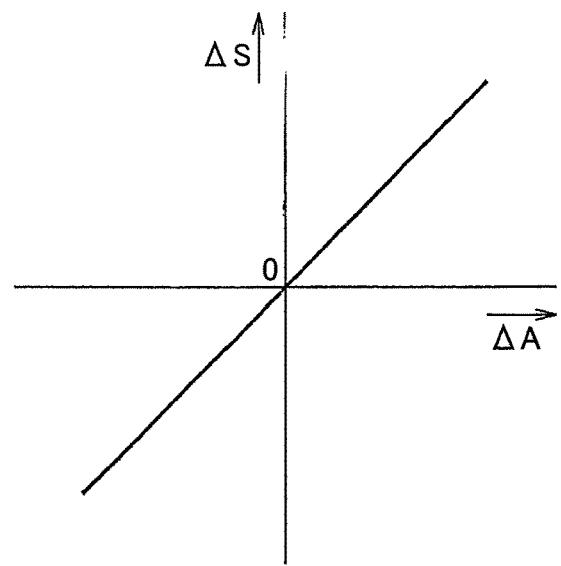
FIG. 9 is a diagram illustrating a relationship between displacement of an amount of intake air ΔA and the displacement of a heat production rate gradient ΔS when an amount of fuel injection is fixed.
Figure 10:
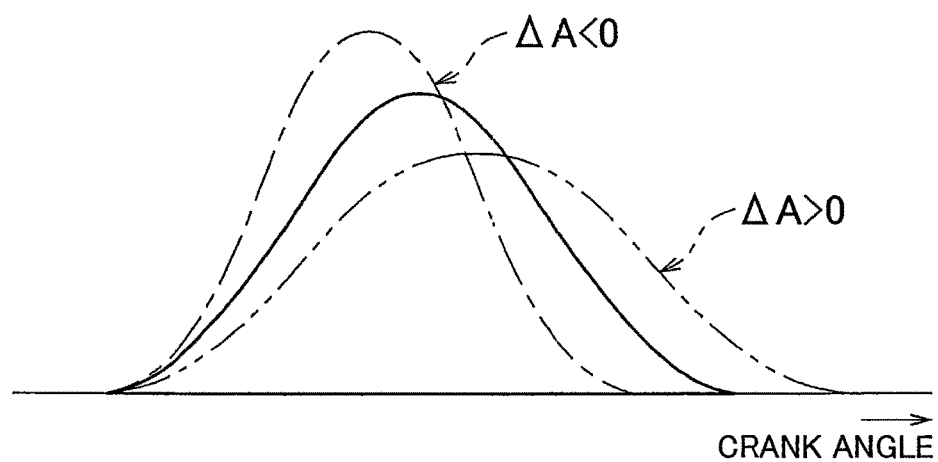
FIG. 10 is a diagram illustrating a relationship between displacement of an amount of intake air and the heat production rate waveform.

The displacement of an amount of intake air ΔA and the displacement of a heat production rate gradient ΔS have the relationship illustrated in FIG. 9. FIG. 9 is a diagram illustrating a relationship between the displacement of an amount of intake air ΔA and the displacement of a heat production rate gradient ΔS when the amount of fuel injection is fixed. That is, the larger the displacement of an amount of intake air ΔA becomes (the less the actual amount of intake air is than the reference amount of intake air), the larger the displacement of a heat production rate gradient ΔS becomes (the smaller the actual heat production rate gradient Sr is than the reference heat production rate gradient Sb). From the viewpoint of using the heat production rate waveform, when the displacement of an amount of intake air $\Delta A$ has a minus value in the ideal heat production rate waveform (solid line), that is, the actual amount of intake air is great, as illustrated in FIG. 10, the heat production rate gradient increases as indicated by a one-dot chain line in the drawing. On the other hand, when the displacement of an amount of intake air $\Delta A$ has a plus value, that is, the actual amount of intake air is small, the heat production rate gradient decreases as indicated by a two-dot chain line in the drawing.

In this way, there is a correlation among the displacement of a heat production rate gradient $\Delta S$, the displacement of an amount of intake air $\Delta A$, and the displacement of an amount of fuel injection $\Delta f$. The function g of Expression (3-5) obtained as described above is a function representing the correlation among the displacement of a heat production rate gradient $\Delta S$, the displacement of an amount of intake air $\Delta A$, and the displacement of an amount of fuel injection $\Delta f$.

Expression (3) can be obtained by solving Expression (3-5) with respect to $\Delta A$. That is, the displacement of an amount of intake air $\Delta A$ can be calculated by the function h having the displacement of a heat production rate gradient $\Delta S$, the actual amount of intake air, the displacement of an amount of fuel injection $\Delta f$, and the actual amount of fuel injection as variables.

After the calculating of the displacement of an amount of fuel injection $\Delta f$ (step ST4) and the calculating of the displacement of an amount of intake air $\Delta A$ (step ST7) are performed in this way, the operation of correcting the amount of fuel injection depending on the displacement of an amount of fuel injection $\Delta f$ and the operation of correcting the amount of intake air depending on the displacement of an amount of intake air $\Delta A$ are performed in step ST8.

In the operation of correcting the amount of fuel injection, the amount of fuel injection from the injector 23 is corrected by the displacement $\Delta f$. That is, when the displacement of an amount of fuel injection $\Delta f$ has a plus value, the fuel injection correction value for increasing the amount of fuel injection by the displacement $\Delta f$ is calculated and the amount of fuel injection is corrected to increase by the fuel injection correction value (corrected to increase from the current amount of fuel injection). Specifically, the valve-opening period of the injector 23 is extended by the period corresponding to the fuel injection correction value. On the other hand, when the displacement of an amount of fuel injection $\Delta f$ has a minus value, the fuel injection correction value for decreasing the amount of fuel injection by the displacement $\Delta f$ is calculated and the amount of fuel injection is corrected to decrease by the fuel injection correction value (corrected to decrease from the current amount of fuel injection). Specifically, the valve-opening period of the injector 23 is shortened by the period corresponding to the fuel injection correction value. The changing of the valve-opening period of the injector 23 is performed on the basis of the map for calculating the degree of change of the valve-opening period of the injector 23 from the fuel injection correction value and the fuel pressure (rail pressure).

The operation of correcting the amount of fuel injection may be performed at the time of injecting fuel in the subsequent combustion stroke in the target cylinder or may be performed at the time of injecting fuel in another cylinder corresponding to a combustion stroke subsequent to the combustion stroke of the target cylinder.

On the other hand, in the operation of correcting the amount of intake air, the amount of intake air is corrected by the displacement $\Delta A$ by controlling the variable nozzle vane mechanism 54 of the turbocharger 5. That is, when the displacement of an amount of intake air $\Delta A$ has a plus value, the intake air correction value for increasing the amount of intake air by the displacement $\Delta A$ is calculated and the amount of intake air is corrected to increase by the intake air correction value (corrected to increase from the current amount of intake air). Specifically, the actuator is operated to reduce the channel area between the neighboring nozzle vanes 54a, 54a in the variable nozzle vane mechanism 54, whereby the supercharging pressure is raised to increase the amount of intake air by the intake air correction value. On the other hand, when the displacement of an amount of intake air $\Delta A$ has a minus value, the intake air correction value for decreasing the amount of intake air by the displacement $\Delta A$ is calculated and the amount of intake air is corrected to decrease by the intake air correction value (corrected to decrease from the current amount of intake air). Specifically, the actuator is operated to enlarge the channel area between the neighboring nozzle vanes 54a, 54a in the variable nozzle vane mechanism 54, whereby the supercharging pressure is lowered to decrease the amount of intake air by the intake air correction value. The relationship among the degree of operation of the actuator, the variation in the supercharging pressure, and the variation in the amount of intake air is calculated in advance by experiment or simulation, and thus when the intake air correction value is determined, the degree of operation of the actuator is determined accordingly.

The operation of correcting the amount of intake air may be performed at the time of injecting fuel in the subsequent intake stroke in the target cylinder or may be performed in the intake stroke in another cylinder corresponding to a combustion stroke subsequent to the combustion stroke of the target cylinder.

As described above, in this embodiment, the amount of fuel injection is determined depending on the fuel injection correction value calculated on the basis of the difference between the reference amount of heat production Qb and the actual amount of heat production Qr. That is, the amount of fuel injection increases or decreases by the fuel injection correction value, whereby an appropriate amount of fuel injection is obtained. The amount of intake air is determined depending on the intake air correction value calculated on the basis of the difference $\Delta S$ between the reference heat production rate gradient Sb and the actual heat production rate gradient Sr and the displacement of an amount of fuel injection $\Delta f$. That is, the amount of intake air increases or decreases by the intake air correction value to obtain an appropriate amount of intake air.

As described above, in the related art, the control of the amount of fuel injection is performed on the basis of the technical idea that the actual air-fuel ratio gets close to the target air-fuel ratio. Accordingly, even when the actual air-fuel ratio matches the target fuel ratio, the amount of fuel injection becomes larger than that is appropriate to cause degradation in fuel consumption or the amount of fuel injection becomes smaller than that is appropriate to cause degradation in drivability.

In this embodiment, it is possible to adjust the amount of fuel injection and the amount of intake air by individually calculating the fuel injection correction value and the intake air correction value and individually performing the injected fuel control based on the fuel injection correction value and the intake air control based on the intake air correction value. The reference amount of heat production Qb and the reference heat production rate gradient Sb are set to correspond to the combustion state when an appropriate amount of fuel injection and an appropriate amount of intake air are obtained and the target air-fuel ratio is achieved. Accordingly, it is possible to cause the actual air-fuel ratio to approach or match the target air-fuel ratio while individually performing the injected fuel control and the intake air control. As a result, it is possible to adjust the combustion state of fuel in the combustion chamber without causing the degradation in fuel consumption or the degradation in drivability.

Second Embodiment

A second embodiment will be described below. This embodiment describes an example where the temperature in the combustion chamber 3 in the fuel injection period of fuel (for example, fuel injected in the main injection) injected from the injector 23 is equal to or higher than the premixed combustion start temperature of the fuel (for example, 900 K) and less than the diffusive combustion start temperature of the fuel (for example, 1000 K) (most fuel is subjected to the premixed combustion) at the time of operating the engine 1 with a light load.

The premixed combustion is more greatly affected by the amount of oxygen than the diffusive combustion. That is, in the premixed combustion, even when the displacement of an amount of intake air $\Delta A$ is relatively small, the large variation in the actual heat production rate gradient Sr appears. Accordingly, when most of the fuel injected from the injector 23 is subjected to the premixed combustion, it is necessary to correct the amount of intake air in consideration of the fact that it is more greatly affected by the amount of oxygen than when most fuel is subjected to the diffusive combustion (when the temperature in the combustion chamber 3 in the fuel combustion period is equal to or higher than the diffusive combustion start temperature: the first embodiment).

The operation of correcting the amount of fuel injection in this embodiment is the same as described in the first embodiment and thus description thereof will not be repeated.

On the other hand, the operation of correcting the amount of intake air in this embodiment is performed in consideration of that fact that it is greatly affected by the amount of oxygen as described above. Specifically, Expression (4) is used to calculate the displacement of an amount of intake air $\Delta A$ in step ST7 in the flowchart (FIG. 5) described in the first embodiment.

$$\Delta A = h(\Delta S, \text{ actual amount of intake air}, \Delta f, \text{ actual amount of fuel injection}) \times k \quad (4)$$

Here, "k" is a correction coefficient and has a plural value less than "1". The specific numerical value is determined by experiment or simulation.

In this way, when most fuel is subjected to the premixed combustion, the difference $\Delta S$ between the reference heat production rate gradient Sb and the actual heat production rate gradient Sr is equal to the displacement of an amount of fuel injection $\Delta f$ but the displacement of an amount of intake air $\Delta A$ is calculated to be small and thus the intake air correction value is set to be small, in comparison with the case where most fuel is subjected to the diffusive combustion.

In this way, the displacement of an amount of intake air $\Delta A$ can be calculated in consideration of the affection of an amount of oxygen. That is, the displacement of an amount of intake air $\Delta A$ is prevented from being calculated as a value greater than the original displacement of an amount of intake air $\Delta A$ and thus the amount of intake air can be appropriately corrected even when most fuel is subjected to the premixed combustion. Accordingly, it is possible to achieve adjustment of the amount of intake air depending on the combustion type of fuel.

In the above-mentioned embodiments describe that the invention is applied to a in-line 4 cylinders diesel engine 1 mounted on an automobile. The invention is not limited to use for an automobile, but may be applied to an engine used for other applications. The number of cylinders or the engine type (types such as in-line engine, V-type engine, and horizontal opposed engine) is not particularly limited. The invention is not limited to the diesel engine using light oil as fuel, but may be applied to engines gasoline or other fuel.

In the above-mentioned embodiments, the amount of fuel injection and the amount of intake air are corrected for combustion of fuel injected in the main inject. The invention is not limited to this example, but the amount of fuel injection and the amount of intake air may be corrected for other combustion (combustion based on, for example, pilot injection, preliminary injection, and after injection).

In the above-mentioned embodiments, the turbocharger 5 is described as the air intake control unit. That is, as the operation of correcting the amount of intake air, the variable nozzle vane mechanism 54 of the turbocharger 5 is controlled to adjust the supercharging pressure. The invention is not limited to this example, but the amount of intake air (the amount of oxygen introduced into the cylinder) may be corrected by adjustment of opening of the intake throttle valve 64, adjustment of the opening of the EGR valve 81, adjustment of the degree of cooling of the intercooler 65 or the EGR cooler 82, and the like. That is, the intake throttle valve 64, the EGR valve 81, the intercooler 65, the EGR cooler 82, and the like may be employed as the air intake control unit. In this case, two of the plural units may be selected to correct the amount of intake air, or at least two of the plural units may be combined to correct the amount of intake air. Particularly, in case of the diesel engine 1 described in the above-mentioned embodiments, it is preferable that the control of the variable nozzle vane mechanism 54 of the turbocharger 5 be preferentially performed out of the plural units. On the other hand, in case of a gasoline engine, it is preferable that the correction of the amount of intake air using the adjustment of the opening of the throttle valve be preferentially performed. The reason is that the controllability of the amount of intake air is high.

In the above-mentioned embodiments, the displacement of an amount of fuel injection $\Delta f$ is used to calculate the displacement of an amount of intake air $\Delta A$. In the invention, the displacement of an amount of fuel injection $\Delta f$ may be converted into the fuel injection correction value calculated from the displacement of an amount of fuel injection $\Delta f$ and the displacement of an amount of intake air $\Delta A$ may be calculated.

In the above-mentioned embodiments, the amount of fuel injection is controlled by setting the displacement of an amount of fuel injection $\Delta f$ and the fuel injection correction value to the same value. The invention is not limited to this example, but the amount of fuel injection may be controlled by setting a value, which, is obtained by multiplying the displacement of an amount of fuel injection $\Delta f$ by a predetermined coefficient, as the fuel injection correction value. Similarly, in the above-mentioned embodiments, the amount of intake air is controlled by setting the displacement of an amount of intake air $\Delta A$ and the intake air correction value to the same value. The invention is not limited to this example, but the amount of intake air may be corrected by setting a value, which is obtained by multiplying the displacement of an amount of intake air ΔA by a predetermined coefficient, as the intake air correction value.

In the above-mentioned embodiments, the displacement of an amount of fuel injection Δf is calculated on the basis of the difference between the reference amount of heat production Qb and the actual amount of heat production Qr. The invention is not limited to this example, but the technical idea of the invention includes an example where the fuel injection correction value is calculated on the basis of the difference between the reference amount of heat production Qb and the actual amount of heat production Qr without calculating the displacement of an amount of fuel injection Δf. Similarly, in the above-mentioned embodiments, the displacement of an amount of intake air ΔA is calculated on the basis of the difference between the reference heat production rate gradient Sb and the actual heat production rate gradient Sr and the displacement of an amount of fuel injection Δf and the intake air correction value is calculated from the displacement of an amount of intake air ΔA. The invention is not limited to this example, but the technical idea of the invention includes an example where the intake air correction value is calculated on the basis of the difference between the reference heat production rate gradient Sb and the actual heat production rate gradient Sr and the displacement of an amount of fuel injection Δf without calculating the displacement of an amount of intake air ΔA.

The above-mentioned embodiments describe the engine 1 to which the piezoelectric injector 23 changing the fuel injection rate to be fully opened in only the power-supplied period is applied, but the invention can be applied to an engine to which a variable injection rate injector is applied.

The invention can be applied to operations of correcting an amount of fuel injection and an amount of intake air in a diesel engine mounted on an automobile.

The invention claimed is:

1. A control device for an internal combustion engine, the control device comprising:
an electronic control unit configured to:
a) calculate a fuel injection correction value and a displacement of an amount of fuel injection based on a first difference, the first difference being a difference between a predetermined reference amount of heat production and an actual amount of heat production,
b) control the amount of fuel injection based on the fuel injection correction value,
c) calculate an intake air correction value based on a second difference and any one of the displacement of the amount of fuel injection and the fuel injection correction value, the second difference being a difference between a predetermined gradient of the reference amount of heat production and a gradient of the actual amount of heat production, and
d) control an amount of intake air based on the intake air correction value.

2. The control device according to claim 1, wherein the reference amount of heat production is set based on a predetermined amount of fuel injection.

3. The control device according to claim 1, wherein the gradient of the reference amount of heat production is set based on a predetermined amount of intake air and a predetermined amount of fuel injection.

4. The control device according to claim 1, wherein the electronic control unit is configured to calculate the displacement of the amount of fuel injection by dividing the first difference by heat production efficiency that is an amount of heat production per unit volume of fuel, and
wherein the electronic control unit is configured to calculate the fuel injection correction value based on the displacement of the amount of fuel injection.

5. The control device according to claim 1, wherein the electronic control unit is configured to calculate the displacement of the amount of fuel injection by dividing the first difference by heat production efficiency that is an amount of heat production per unit volume of fuel,
wherein the electronic control unit is configured to calculate displacement of the amount of intake air based on the displacement of the amount of fuel injection, an actual amount of intake air, and an actual amount of fuel injection, and
wherein the electronic control unit is configured to calculate the intake air correction value based on the displacement of the amount of intake air.

6. The control device according to claim 1, wherein the electronic control unit is configured to set the intake air correction value such that even when the second difference and any one of the displacement of the amount of fuel injection and the fuel injection correction value in a first case are the same as the second difference and any one of the displacement of the amount of fuel injection and the fuel injection correction value in a second case, the intake air correction value in the first case is smaller than the intake air correction value in the second case, wherein:
the first case is a case where a temperature in a combustion chamber in a fuel injection period is equal to or higher than a premixed combustion start temperature of the fuel and less than a diffusive combustion start temperature of the fuel, and
the second case is a case where the temperature in the combustion chamber in the fuel injection period is equal to or higher than the diffusive combustion start temperature of the fuel.

7. A control device for an internal combustion engine, the control device comprising:
an electronic control unit configured to:
a) calculate a fuel injection correction value based on a first difference, the first difference being a difference between a predetermined reference amount of heat production and an actual amount of heat production,
b) control an amount of fuel injection based on the fuel injection correction value,
c) calculate an intake air correction value based on a second difference and the fuel injection correction value, the second difference being a difference between a predetermined gradient of the reference amount of heat production and a gradient of the actual amount of heat production, and
d) control an amount of intake air based on the intake air correction value.

* * * * *